US011395127B2

(12) United States Patent
Sahin et al.

(10) Patent No.: US 11,395,127 B2
(45) Date of Patent: Jul. 19, 2022

(54) WIRELESS MANAGEMENT AND CONNECTIVITY ACROSS MULTIPLE NETWORKS

(71) Applicant: Charter Communications Operating, LLC, St. Louis, MO (US)

(72) Inventors: Yildirim Sahin, Englewood, CO (US); Curt C. Wong, Bellevue, WA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/001,935

(22) Filed: Aug. 25, 2020

(65) Prior Publication Data

US 2022/0070649 A1 Mar. 3, 2022

(51) Int. Cl.

*H04W 8/00* (2009.01)
*H04W 8/02* (2009.01)
*H04W 60/04* (2009.01)
*H04L 65/10* (2022.01)
*H04L 65/1016* (2022.01)
*H04L 65/1073* (2022.01)

(52) U.S. Cl.

CPC ........... *H04W 8/02* (2013.01); *H04L 65/1006* (2013.01); *H04L 65/1016* (2013.01); *H04L 65/1073* (2013.01); *H04W 60/04* (2013.01)

(58) Field of Classification Search

CPC .... H04W 8/02; H04W 60/04; H04L 65/1006; H04L 65/1016; H04L 65/1073

See application file for complete search history.

(56) References Cited

U.S. PATENT DOCUMENTS

2006/0193308 A1* 8/2006 Sung .................. H04L 29/1233 370/352
2020/0236527 A1* 7/2020 Sood ....................... H04W 8/20
2021/0105712 A1* 4/2021 Speicher ............... H04W 48/08
2021/0258824 A1* 8/2021 John ................ H04W 28/0284

FOREIGN PATENT DOCUMENTS

WO WO2022035512 A1 * 2/2022

OTHER PUBLICATIONS

GSMA (Steering of Roaming Implementation Guidelines, Version 5.0, May 4, 2020) (Year: 2020).*

3rd Generation Partnership Project; "Technical Specification Group Core Network and Terminals: Non-Access-Stratum (NAS) functions related to Mobile Station (MS) in idle mode", (Release 16), 3GPP TS 23.122 V16.5.0, Mar. 27, 2020, Published in the United States, pp. 1-80.

* cited by examiner

*Primary Examiner* — Khai M Nguyen
(74) *Attorney, Agent, or Firm* — Armis IP Law, LLC

(57) ABSTRACT

A communication management resource receives notification of a registration request associated with user equipment present in a wireless network environment. In response to receiving the registration request, the communication management resource executes a roaming management function on behalf of the user equipment. Via the roaming management function, the communication management resource manages roaming of the user equipment in the wireless network environment. Using an SoR type mechanism as described herein allows a PLMN/SNPN operator to control their subscribers to what roaming SNPN network that they should select/reselect during wireless registration and at any time after registration based on the type of wireless services.

32 Claims, 11 Drawing Sheets

WIRELESS MANAGEMENT AND CONNECTIVITY ACROSS MULTIPLE NETWORKS

BACKGROUND

Conventional 5G System architectures are designed to support a wide variety of networks, including 5G PLMN (Public Land Mobile Network) and private networks (a.k.a., SNPN—Standalone Non-Public Network). Implementation of SNPNs using the 5G architecture is defined in 3GPP TS 23.501 Release 16.

Additional architecture/signaling associated with wireless communications is specified in Section C.2 of 3GPP TS 23.122 v16.5.0 and Section C.3 of 3GPP TS 23.122 v16.5.0.

In general, as its name suggests, the SNPN in 5G allows private entities to support wireless communications to members of an organization. Such networks are useful because a corresponding service provider (such as a company) has more control over such a network.

BRIEF DESCRIPTION OF EMBODIMENTS

There are deficiencies associated with conventional wireless networks and roaming. For example, as part of a call flow, IMS (Internet Protocol Multimedia Subsystem) registration may be rejected by a respective HSS (Home Subscriber Server). When the HSS decides not to accept the IMS/SIP (Session Initiation Protocol) registration in a VSNPN (Visited SNPN), e.g., due to IMS roaming restriction for the VSNPN, embodiments herein extend an action to be taken by the HSS by informing the UDM (Unified Data Management) about the unsuccessful IMS registration so that the UDM may initiate so-called SoR (Steering of Roaming) signaling towards the UE (User Equipment). Via the SoR signaling, the service provider and corresponding network controls roaming connectivity of a respective mobile communication device (user equipment) to a different service provider's wireless network.

Embodiments herein include controlling roaming and/or use of wireless networks by a communication device.

One specific example embodiment herein includes introducing new signaling/indications between HSS and UDM in which the HSS informs the UDM about the ongoing IMS/SIP Registration with a reason code; then the UDM initiates signaling (such as communication of roaming information including a list of candidate wireless networks in which to connect) towards the UE so that the UE may try to select/roam into a more appropriate SNPN (wireless network) as per the SoR data (list of candidate wireless networks). In one embodiment, the reason code or notification can be, for example, a request to trigger a new SNPN selection, IMS rejected due to non IMS roaming agreement, etc. Embodiments herein further extend an existing SoR solution such as specified in TS 23.122 R16 to support SoR mechanism for SNPN roaming.

Note that based on business agreements between wireless network operators, a PLMN subscriber may also roam into an SNPN wireless network. Therefore, in one embodiment, the home network of the roaming subscriber as described herein is considered to be a PLMN or an SNPN or other suitable entity. Thus, embodiments herein include providing roaming control or support such that a network operator is able to influence and/or control connectivity of a respective device to a desired network (such as network of a partner).

Further, in accordance with embodiments herein, using the so-called SoR type mechanism and SoR data notification (such as roaming information including a list of candidate wireless networks) as described herein enables a PLMN/SNPN operator (service provider) to control their subscribers to what roaming SNPN network (target wireless network) that they should select/reselect during 5G registration and at any time after registration based on the type of services (e.g. internet data, IMS voice).

In accordance with still further example embodiments, a communication management resource in a wireless network environment (such as associated with a stand-alone non-public network) receives notification of a registration request associated with user equipment present in communication with another stand-alone non-public network. In response to receiving the registration request, the communication management resource executes a roaming management function on behalf of the user equipment. Via the roaming management function, the communication management resource manages/controls roaming of the user equipment in the wireless network environment.

In one embodiment, using an SoR type mechanism as described herein allows a PLMN/SNPN operator to control their subscribers to what roaming SNPN network that they should select/reselect during wireless registration and at any time after registration based on the type of wireless services.

In accordance with further example embodiments, the managing the roaming of the user equipment visual indication the communication management resource includes: communicating a message to the user equipment. The message indicates a set of network identifier values indicate corresponding candidate wireless networks (such as one or more stand-alone non-public networks) available to the user equipment to access a remote network.

In still further example embodiments, the notification of the registration request is received at the communication management resource in response to the user equipment performing SIP (Session Initiation Protocol) registration.

Additionally, or alternatively, the registration request as described herein is an IMS (Internet Protocol Multimedia Subsystem) registration request.

Additionally, or alternatively, the registration request as described herein is an SNPN (Standalone Non-Public Network) registration request.

Yet further embodiments herein include, via the communication management resource, managing roaming of the user equipment in the wireless network environment based on a geographical location in which the user equipment resides. In other words, selection or priority associated with a stand-alone non-public network can be based on a location of the user equipment requesting services.

In still further example embodiments, the user equipment communicates the registration request through a first wireless network. Managing roaming of the user equipment via the communication management resource includes steering the user equipment to use a second wireless network instead of the first wireless network. In one embodiment, the first wireless network is a visiting wireless network through which the user equipment communicates with a home wireless network to use the first wireless network. A user of the user equipment subscribes to a service provider operating the home wireless network.

In yet further example embodiments, the communication management resource executes the roaming management function in the home wireless network.

Further embodiments herein include the communication management resource receiving, from the user equipment, the registration request communicated by the user equipment through a first wireless network. The communication management resource executes the roaming management function in response to rejecting the user equipment's attempted use of the first wireless network to access a remote network.

These and additional embodiments are further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as one or more co-located or disparately processor devices) to: receive notification of a registration request associated with user equipment present in a wireless network environment; in response to receiving the registration request, execute a roaming management function on behalf of the user equipment; and via the roaming management function, manage roaming of the user equipment in the wireless network environment.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless roaming services via multiple disparately located private wireless networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
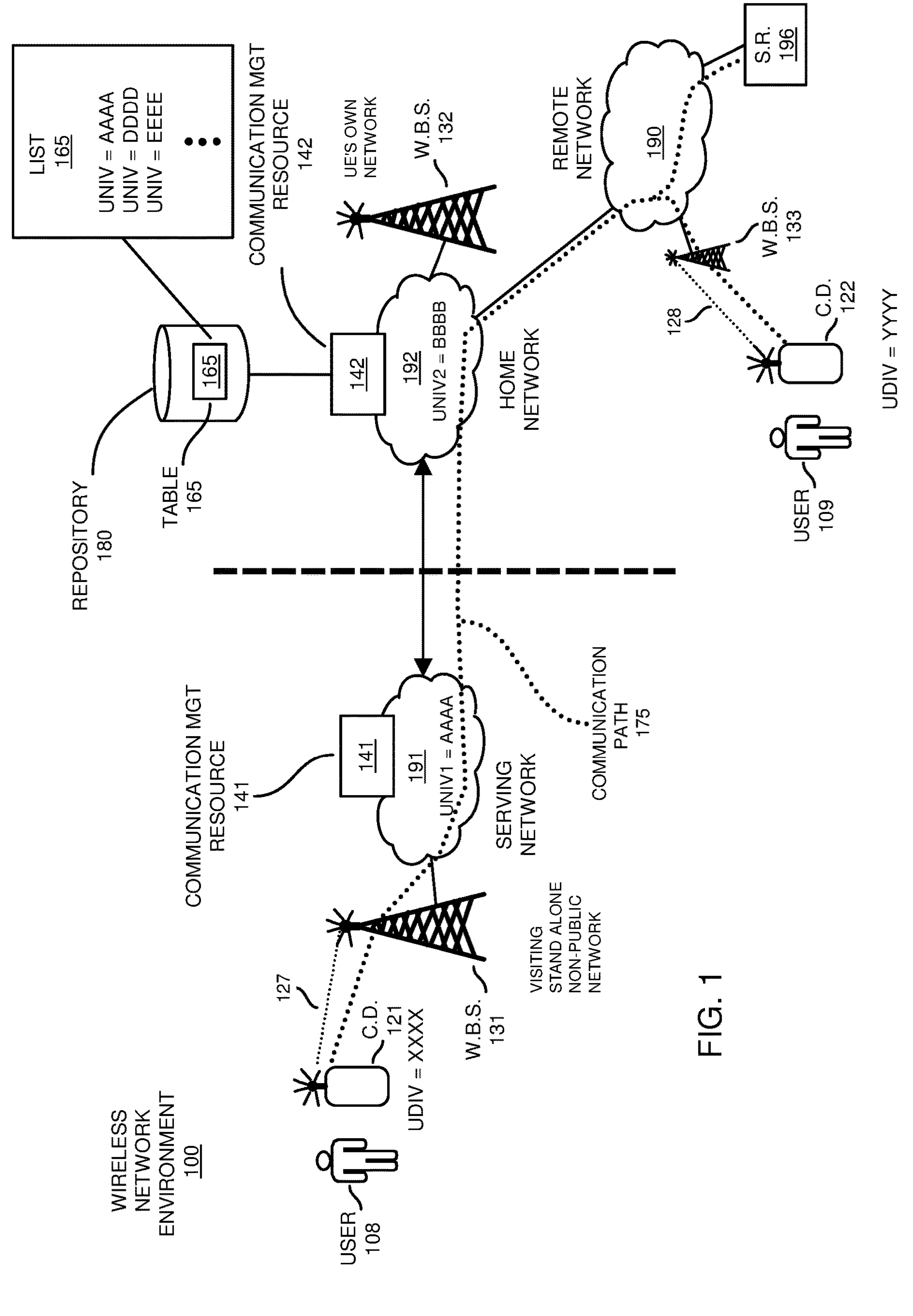
FIG. 1 is an example diagram illustrating connectivity of user equipment to a remote communication device through multiple networks according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a communication management resource receives notification of a request from user equipment to establish a wireless communication link with a remote communication device through a first private wireless network (such as a first private 5G network). The communication management resource resides in a second private wireless network (such as a second private 5G network or subscriber's home public or private 5G network) to which the user of the user equipment is a member (such as an employee, subscriber, etc.). The request requests use of roaming services provided by the first private wireless network to connect the user equipment to a remote communication device.

In addition to receiving the request, the communication management resource of the second private wireless network receives/retrieves a unique network identifier value assigned to the first private network. Via the unique network identifier value, the communication management resource of the second private wireless network may detect that the first private wireless network is associated with (such as provides roaming services for users of) the second wireless network. As described herein, the communication management resource can be configured to control roaming of the user equipment.

In one embodiment, the home routed IMS roaming architecture (home network of the user equipment) for SNPN is simplified and alleviates interworking issues with a visited P-CSCF, hence, allowing more expedient deployment.

In one embodiment, the communication management resource may receive an access request generated by the user equipment. In response to the request, the communication management resource determines a set of one or more candidate wireless networks in which to potentially steer the user equipment. The communication management resource communicates the set of one or more candidate wireless networks and corresponding access type information of those networks to the user equipment. The user equipment then selects amongst the list of candidate wireless networks (such as partner wireless networks associated with the second private wireless network) to connect to a respective remote wireless network.

Now, more specifically, with reference to the drawings, FIG. 1 is an example diagram illustrating connectivity of user equipment to a remote communication device through multiple networks to a target communication device according to embodiments herein.

As shown, wireless network environment 100 includes multiple networks including private wireless network 191 or stand-alone non-public network (such as operated by a first private service provider) and private wireless network 192 or stand-alone non-public network (such as by a second private service provider).

Wireless network 191 includes communication management resource 141 and is assigned unique network identifier value UNIV1=AAAA (such as based on one or more types of identity information or PLMNID1+NID1); wireless network 192 includes communication management resource 142 and is assigned unique network identifier value UNIV2=BBBB (such as based on one or more types of identity information or PLMN2+NID2).

In general, during operation, as further discussed herein, the private wireless network 191 supports roaming for members of private wireless network 192. The combination of networks potentially provides connectivity of the communication device 121 (a.k.a., user equipment or so-called UE such as comprising a combination of ME (Mobile Equipment) and optionally SIM/USIM (Subscriber Identity Module/UMTS Subscriber Identity Module) to a remote network 190. Note that the devices/UEs accessing an SNPN may or may not have an SIM/USIM.

Note that each of the resources as described herein can be implemented via hardware, executed software, or a combination of hardware and executed software.

For example, the communication management resource 141 can be implemented as communication management hardware, communication management software, or a combination of communication management hardware and communication management software.

The communication management resource 142 can be implemented as communication management hardware, communication management software, or a combination of communication management hardware and communication management software.

The communication device 121 (i.e., user equipment or UE) can be implemented as communication hardware, communication software, or a combination of communication hardware and communication software, and so on.

Note further that the first wireless network 191 and the second wireless network 192 can be any suitable type of wireless network.

In one non-limiting example embodiment, the first private wireless network 191 is a so-called serving stand-alone non-public network (SNPN) such as based on 5G or other suitable one or more protocols supporting roaming of the user equipment; the second private wireless network 192 is a home stand-alone non-public wireless network such as based on 5G or other suitable one or more protocols.

Assume in this example embodiment that the user 108 and corresponding communication device 121 (i.e., user equipment) are authorized to use the first private wireless network 191 (such as a serving network) as a guest user (or guest device) for roaming and that the communication device 121 and corresponding user 108 are also members of the second private wireless network 192 (such as a home network).

In such an instance, the communication management resource 142 associated with private wireless network 192 stores an identity of the first private wireless network 191 in table 165 (network affiliation information) of repository 180.

In one embodiment, the table 165 includes identities of other networks in the wireless network environment 100 that provide roaming or other wireless services to members of the private wireless network 192.

In accordance with further example embodiments, the table 165 includes identities of members of the private wireless network 192 that are to be provided roaming services.

Depending on various reasons such as roaming agreements, cost of roaming, or type of allowed services (data, voice, data+voice) during roaming, spread of roaming subscribers into multiple roaming partner SNPNs in a given area or country, an SNPN operator (or a PLMN operator) may need to control its roaming subscribers (such as user 108 and corresponding communication device 121) and which roaming partner's SNPN the communication device 121 should connect to.

In 3GPP, IMS layer is defined independently to avoid inter-dependency with lower access layer (e.g, IP-CAN).

Therefore, it is possible that the UE (User) can access the lower access layer for data transport while being rejected for IMS services. In this case, user may have to manually look for another access network to try. To avoid this scenario, embodiments herein include, via the communication management resource 142 or other suitable entity such as a UDM, roaming partner selection and re-selection, such as by using an SoR framework, with additional functions as described herein.

For example, as further discussed herein, the communication management resource 142 may grant the communication device 121 permission to use the wireless network 191 and/or corresponding base station to access remote network 190. However, in accordance with further example embodiments as described herein in FIG. 2 and other FIGS., the communication management resource 141 may prevent the communication device 121 from using the wireless network 191 and/or steer the communication device 121 (such as via a steering function) to a different wireless network more suitable for use by the communication device 121.

Referring again to FIG. 1, in this example embodiment, the table 165 (list of wireless networks, policy information) indicates other private wireless networks in the wireless network environment 100 that support guest wireless services/connectivity to the members of the (home) private wireless network 192.

More specifically, assume that the service provider (such as a second private company) operating private wireless network 192 has a roaming agreement with the service provider (such as first private company) operating private wireless network 191.

Assume further that the agreement includes enabling member users (such as user 108 and corresponding communication device 121) of the second private wireless network 192 to use wireless services associated with the first private wireless network 191. In such an instance, the table 165 includes an identity (UNIV1=AAAA) associated with the private wireless network 191 as a roaming service provider associated with the second private wireless network 192.

Thus, inclusion of the unique network identifier value UNIV1=AAAA in the table 165 indicates that the private wireless network 191 is an authorized network in which to provide the communication device 121 roaming wireless communication services through a combination of wireless network 191 and wireless network 192 as further discussed below.

Assume further that each of yet further wireless networks having assigned unique identifier values DDDD, EEEE, etc., are also partners of the home network 192. In such an instance, these wireless networks are candidate wireless networks in which the communication device 121 may connect in order to be provided connectivity to the remote wireless network 190 and target device such as communication device 122 or server resource 196.

With further reference to FIG. 1, when in wireless range of wireless base station 132, the communication device 121 has access to the remote network 190 (such as the Internet, land mobile or cellular network, etc.) via communications through the wireless base station 132 and wireless network 192 to the remote network 190. However, when out of range of the private wireless network 192, the communication device 121 must rely on use of supplemental roaming services provided by the private wireless network 191.

As previously discussed, assume that the operator of the wireless network 191 supports roaming of the communication device 121 and connectivity to the remote network 190 when the communication device 121 is outside of a wireless range of the wireless network 191 and corresponding one or more wireless base stations.

In one embodiment, to establish a wireless communication link between the communication device 121 and the private wireless network 191 while the communication device 121 is roaming and out of range with respect to the second private wireless network 192 and corresponding one or more wireless base stations, the communication device 121 communicates a communication link request to the wireless base station 131 of the first private wireless network 191 via wireless communication link 127.

The first private wireless network 191, such as via the communication management resource 141, communicates the link request (such as including a SIP registration request) to the communication management resource 142 in the second private wireless network 192.

In one nonlimiting example embodiment, the communication device 121 generates the link request to establish a respective call connection with the communication device 122 operated by the user 109. Additionally, or alternatively, the communication device 121 generates the link request to establish a respective data connection with the server resource 196.

In one embodiment, the request from the communication device 121 to establish a respective wireless communication link includes an identity (such as the unique device identifier value UDIV1=XXXX) of the communication device 121. In one embodiment, the value XXXX is a network address assigned to the communication device 121.

Via the unique device identifier value=XXXX and potentially other credentials as well associated with the communication device 121, the communication management resource 142 determines that the communication device 121 is an authorized member of the second private wireless network 192.

Based on notification of the request to establish a respective wireless communication link and connectivity, and in furtherance of providing requested connectivity to the authorized user 108, the communication management resource 142 in the second private wireless network 192 retrieves (such as via communications with the communication management resource 141 in the first private wireless network 191) a unique network identifier value (UNIV1=AAAA) assigned to the first private network 191.

In one embodiment, forwarding of the roaming request associated with the communication device 121 includes communicating an identifier (such as AAAA or other suitable one or more values) of the private wireless network 191 from the communication management resource 141 to the communication management resource 142 of the primary wireless network 192.

Via the unique network identifier value (such as received value=UNIV1=AAAA), the communication management resource 142 detects that the first private wireless network 191 has an association (according to a roaming support agreement) with the second wireless network 192 and that the communication device 121 should be provided requested wireless services. In one embodiment, the communication management resource 142 performs a look-up in table 165 (policy information) to determine if the private wireless network 192 is authorized to support roaming services to the user 108 of the second private wireless network 192.

Based on the detected association, and that the first private wireless network 191 is a roaming partner with respect to the private wireless network 191, the communication management resource 142 in the second private wireless network 192 supports communication services between the communication device 121 and the remote communication device via a communication path 175 extending through a combination of the first private wireless network 191 and the second private wireless network 192.

In such an instance, the communication path 175 between the communication device 121 and communication device 122 or server resource 196 includes connectivity provided by multiple resources including wireless base station 131, private wireless network 191, private wireless network 192, remote network 190, and wireless base station 133.

Figure 2:
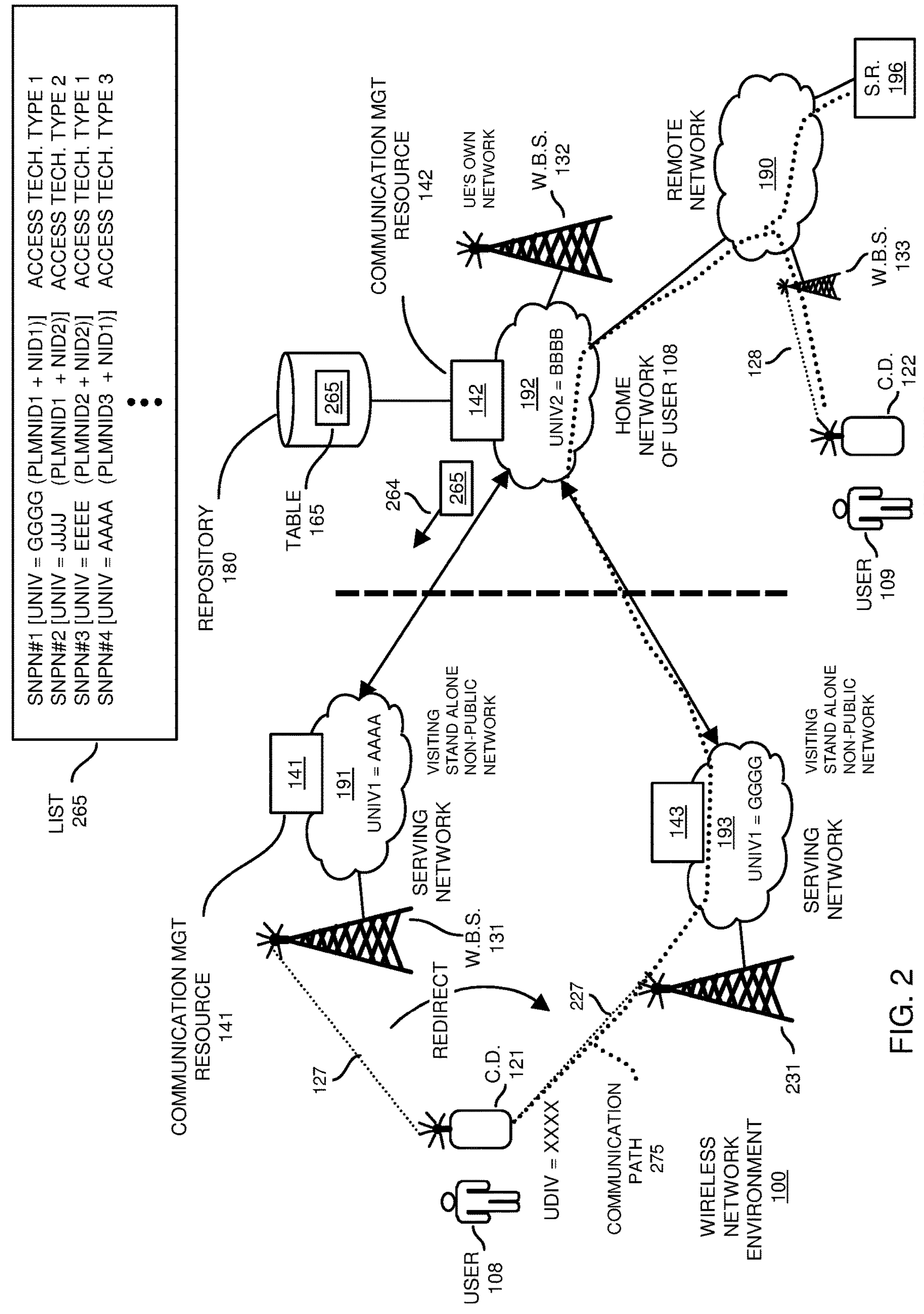
FIG. 2 is an example diagram illustrating connectivity of user equipment to a remote communication device after a redirect to a second wireless network according to embodiments herein.

FIG. 2 is an example diagram illustrating connectivity of user equipment to a remote communication device and a redirect to a second wireless network according to embodiments herein.

As an alternative to the communication device 121 using the wireless network 191 (assigned unique network identifier value AAAA) and corresponding wireless base station 131, in this example embodiment, the communication management resource 142 steers the communication device 121 (via communications 264 including conveyance of list 265) to connect to any of one or more other wireless networks such as stand-alone non-public wireless network (SNPN #1) assigned unique network identifier value GGGG (PLMNID1+NID1), stand-alone non-public wireless network (SNPN #2) assigned unique network identifier value JJJJ (PLMNID1+NID2), stand-alone non-public wireless network (SNPN #3) assigned unique network identifier value EEEE (PLMNID2+NID2), stand-alone non-public wireless network (SNPN #4) assigned unique network identifier value AAAA (PLMNID3+NID1), and so on.

In one embodiment, the list 265 includes additional information indicating one of multiple types of access technology types associated with each stand-alone non-public network. For example, list 265 (i.e., roaming information communicated to the communication device 121) indicates that the stand-alone non-public network #1 supports a first access technology type 1, list 265 (i.e., roaming information) indicates that the stand-alone non-public network #2 supports a second access technology type 2, list 265 (i.e., roaming information) indicates that the stand-alone non-public network #3 supports the first access technology type 1, list 265 (i.e., roaming information) indicates that the stand-alone non-public network #4 supports a third access technology type 3, and so on.

The access technology type can indicate any suitable type of wireless access technology such as NG-RAN or other type of access technology. Thus, the roaming information in list 265 includes a combination of network identity information and access technology type for each candidate stand-alone non-public network.

In one embodiment, the communication device 121 initially communicates with the communication management resource 142 via communications through the wireless network 191 and corresponding wireless base station 131. In response to receiving the request for wireless network services, the communication management resource 142 transmits communications 264 (including roaming information indicated by list 265) through wireless network 192 and wireless network 191 and wireless base station 131 to the communication device 121.

In one embodiment, the list 265 received by the communication device 121 is prioritized. For example, list 265 indicates to the communication device 121 that the wireless network assigned unique network identifier value GGGG is the first most preferred network in which to provide connectivity through the wireless network 192 to the remote network 190 (in such an instance, the combination of wireless network GGGG and BBBB provide the user connectivity to the remote network 190); list 265 indicates to the communication device 121 that the wireless network assigned unique network identifier value JJJJ is the second most preferred network in which to provide connectivity through the wireless network 192 to the remote network 190 (in such an instance, the combination of wireless network JJJJ and BBBB provide the user connectivity to the remote network 190); list 265 indicates to the communication device 121 that the wireless network assigned unique network identifier value EEEE is the third most preferred network in which to provide connectivity through the wireless network 192 to the remote network 190 (in such an instance, the combination of wireless network EEEE and BBBB provide the user connectivity to the remote network 190); and so on.

In this manner, as further discussed herein in more detail below, the communication management resource 142 supports and/or controls roaming capability associated with the communication device 121. In other words, the communication management resource 142 steers the communication device 121 to a suitable wireless network combination (such as wireless network 192 and another candidate wireless network in list 265) other than the wireless network 191 to provide the communication device 121 access to the remote network 190 and corresponding one or more communication resources (such as communication device 122, server resource 196, etc.).

As previously discussed, the list 265 of roaming information includes tag information indicating an access technology type associated with the corresponding candidate stand-alone non-public network.

In one embodiment, the communication device 121 and/or corresponding user 108 selects a wireless network from the list 265. For example, in response to receiving the list 265, the communication device 121 selects to connect to the wireless base station 231 and corresponding network 193 to communicate with the remote network 190 and corresponding communication device 122 or server resource 196. In such an instance, as shown, a combination of the wireless network 193 (stand-alone non-public network #1) and wireless network 192 provide the communication device 121 and corresponding user 108 connecting to the remote network 190.

As an alternative, in response to receiving the roaming information in list 265, the communication device 121 can select to connect to the stand-alone non-public network #2, stand-alone non-public network #3, stand-alone non-public network #4, etc.

Figure 3:
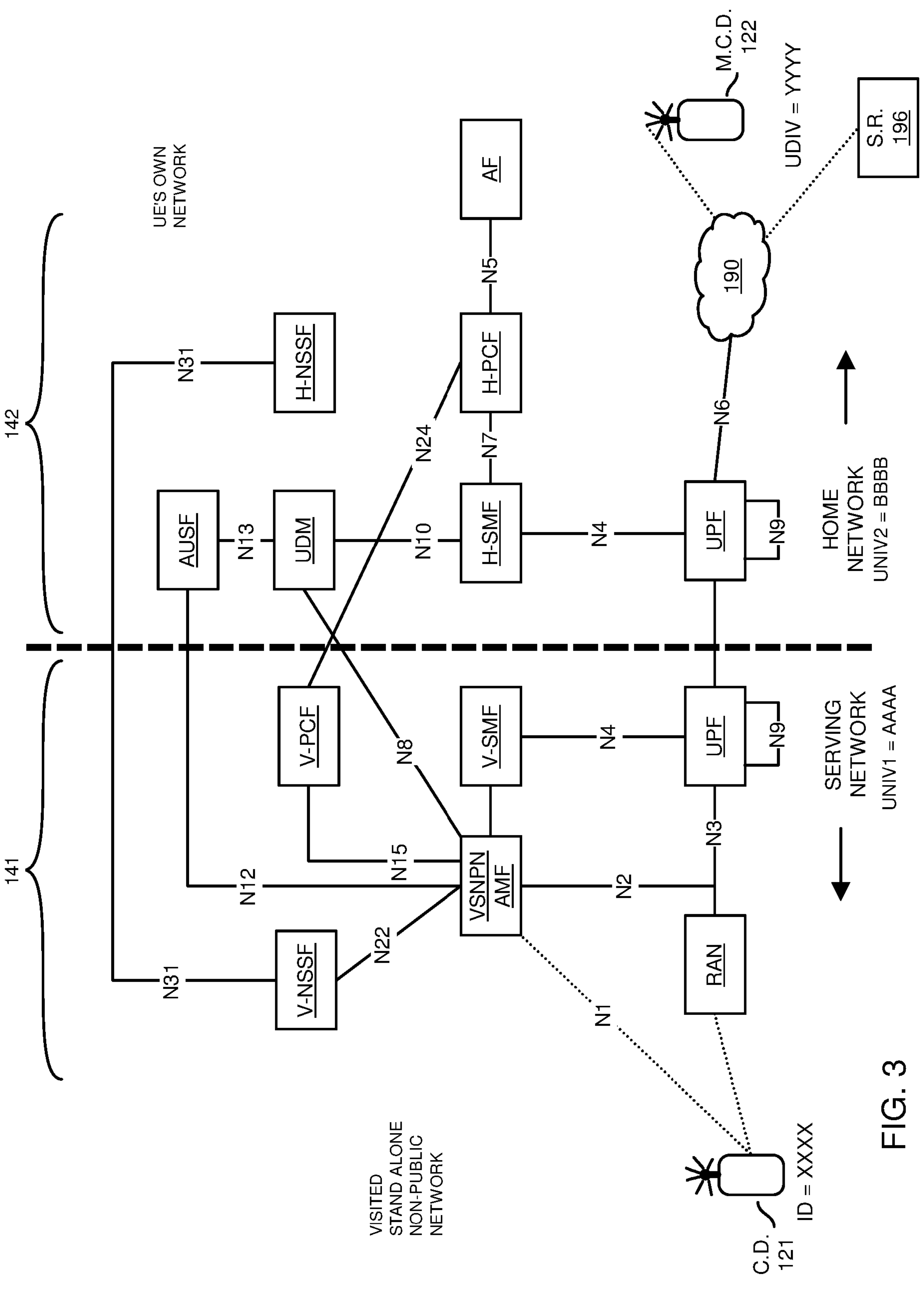
FIG. 3 is an example diagram illustrating connectivity of multiple networks according to embodiments herein.

FIG. 3 is an example diagram illustrating connectivity of multiple networks according to embodiments herein.

As shown, private wireless network 191 and corresponding communication management resource 141 includes hardware and software resources such as V-NSSF (Visited-Network Slice Selection Function), V-PCF (Visited Policy Control Function), AMF (Access and Mobility Management Function), V-SMF (Visited-Session Management Function), RAN (Radio Access Network), and UPF (User Plane Function).

As shown, private wireless network 192 and corresponding private wireless network 192 includes hardware and software resources such as AUSF (Authentication Server Function), UDM (Unified Data Management), H-NSSF (Home-Network Slice Selection Function), H-SMF (Visited-Session Management Function), H-PCF (Home-Policy Control Function), AF (Application Function), and UPF (User Plane Function).

In a manner as previously discussed, and as further discussed below, the combination of private wireless network 191 and private wireless network 192 potentially support connectivity of the communication device 121 to the communication device 122 via a corresponding communication path 175.

Figure 4:
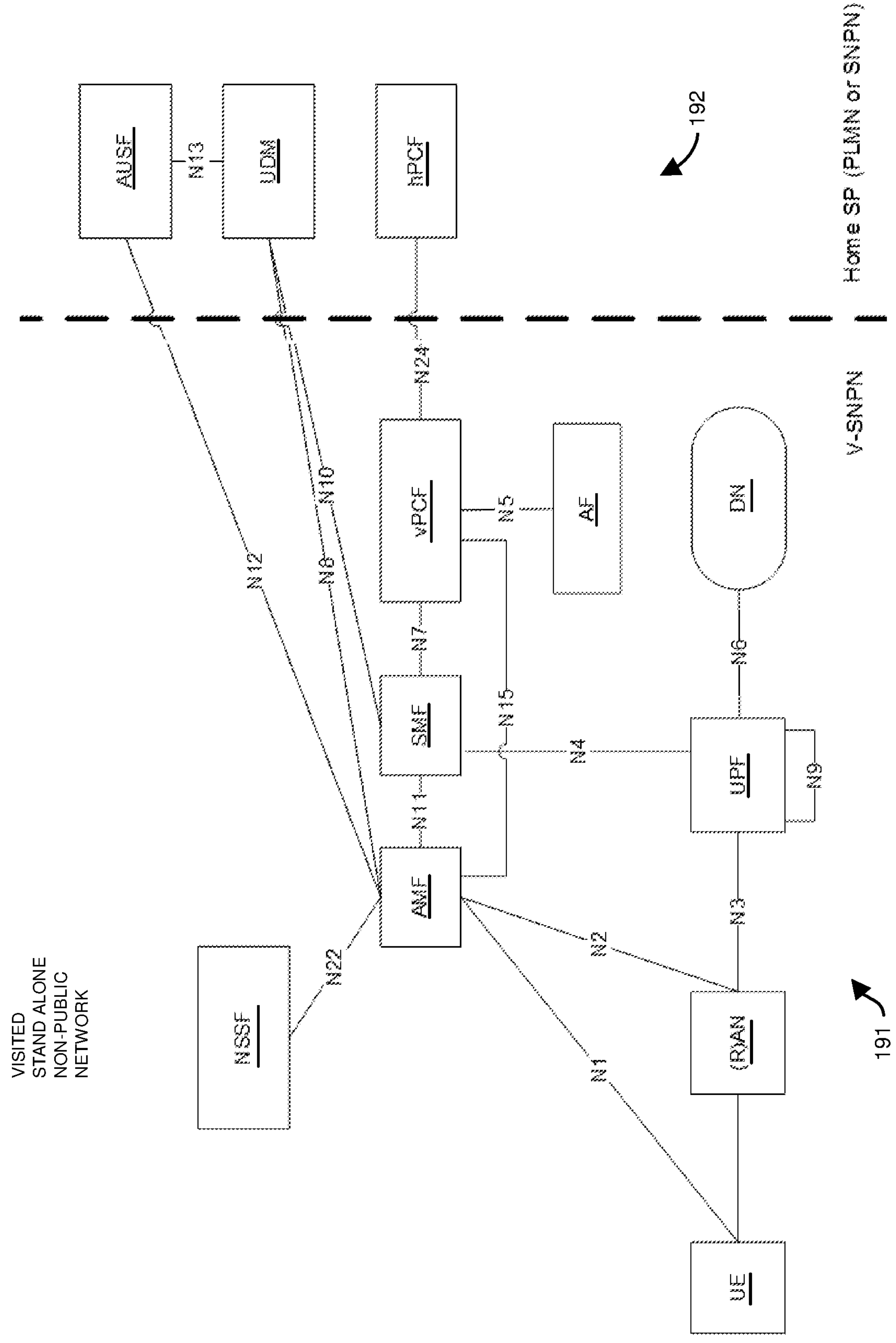
FIG. 4 is an example diagram illustrating a stand-alone non-public network roaming home routed architecture according to embodiments herein.

FIG. 4 is an example diagram illustrating a stand-alone non-public network roaming home routed architecture according to embodiments herein.

In this example embodiment, IMS nodes are located in HPLMN/HSNPN and perform the required IMS signaling with the HSS or the co-located HSS/UDM.

Figure 5:
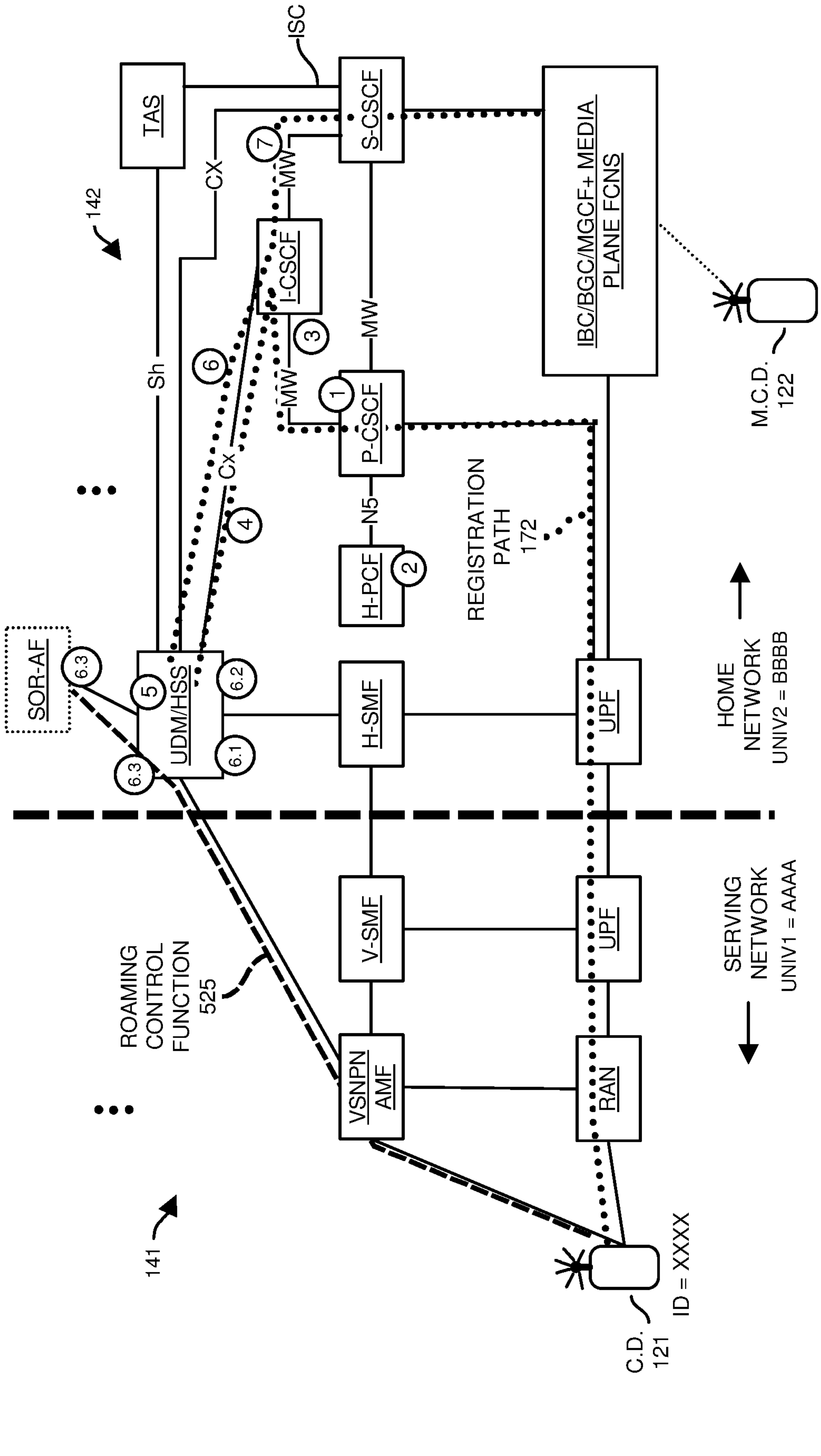
FIG. 5 is an example diagram illustrating signaling in network environment according to embodiments herein.

FIG. 5 is an example diagram illustrating signaling (such as SIP registration signaling or other suitable signaling) to facilitate establishment of a communication link through multiple networks or roaming control according to embodiments herein.

In this example embodiment, in a similar manner as previously discussed, the private wireless network 191 and corresponding communication management resource 141 includes hardware and software resources such as V-PCF (Visited-Policy Control Function), AMF (Access and Mobility Management Function), V-SMF (Visited-Session Management Function), RAN (Radio Access Network), and UPF (User Plane Function).

As further shown, private wireless network 192 and corresponding communication management resource 142 includes hardware and software resources such as UDM/HSS (Unified Data Management/Home Subscriber Server), H-SMF (Home-Session Management Function), H-PCF (Home Policy Control Function), P-CSCF (Proxy Call Session Control Function), I-CSCF (Intermediate Proxy Call Session Control Function), S-CSCF (Serving Call Session Control Function), TAS (Telephony Application Server), and UPF (User Plane Function).

To enable the use of home network (private wireless network 192) routed architecture for IMS, embodiments herein include the following supplemental operations. FIG. 5 includes a depiction of registration path 172 (such as a SIP signaling path) supporting registration and establishment of requested connectivity as described herein. For example, via operation #1, the P-CSCF subscribes to the PCF to be notified of the SNPN ID (UNIV1=AAAA) of the Serving network (private wireless network 191). In one embodiment, the unique network identifier value UNIV1 is designated as PLMN ID3+NID1.

In operation #2, the Npcf_PolicyAuthorization_Notify service operation in the N5 interface (signaling) adds "PlmnIdNid" information elements (such as AAAA) in the communications.

In operation #3, the H-PCF notifies the P-CSCF of the SNPN ID (PLMN ID3+NID1 or UNIV1=AAAA) associated with the serving private wireless network 191.

In operation #4, the Cx-Query is modified to include the SNPN ID (PLMN ID3+NID1 or UNIV1=AAAA) of the serving private wireless network 191.

In operation #5, based on SNPN ID (PLMN ID3+NID1 or UNIV1=AAAA) of the private wireless network 191, the UDM/HSS either rejects or allows the requested IMS registration associated with communication device 121, depending on local home operator policy (such as table 165) and whether it allows private wireless network 191 to support roaming.

In operation #6 (such as 6.1, 6.2, and 6.3), the home network supports (such as via SOR-AF (Steering-of-Roaming Application Function) or UDM/HSS) roaming control of the communication device 121. The SOR-AF is optional. For example, if the SOR-AF is not present, the UDM/HSS performs the roaming functions as described herein.

Additional operations and details of the aforementioned operations are discussed below in the following drawings and text.

Figure 6:
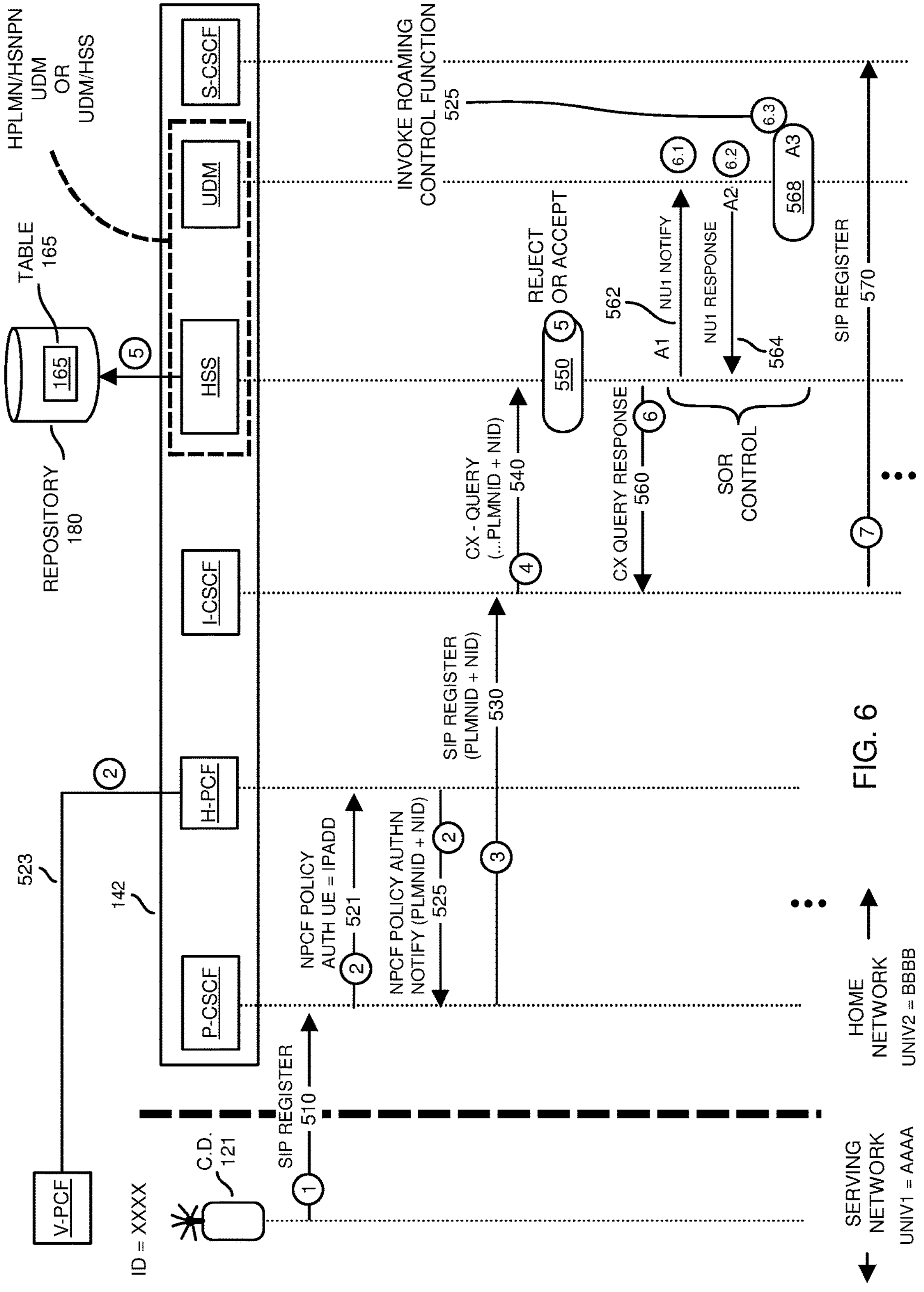
FIG. 6 is an example diagram illustrating a flow of communications facilitating establishment of session connectivity and a communication link according to embodiments herein.

FIG. 6 is an example diagram illustrating a flow of communications facilitating establishment of a communication link according to embodiments herein.

In one embodiment, FIG. 6 illustrates a case in which the communication device 121 is already SNPN registered and the communication device 121 attempts to connect to a different SNPN or use IMS services.

In operation #1, and via communications 510, the communication device 121 sends a request (such as an SIP REGISTER request) through private wireless network 191 to the P-CSCF of private wireless network 192. In one embodiment, the request associated with communications 510 includes the unique device identifier value XXXX (such as network address) associated with the communication device 121.

As previously discussed, in one embodiment, the communication device 121 (user equipment) generates the request in order to establish a voice communication session (such as a phone call) with a remote communication device 122 over the (serving) first private wireless network 191. As further discussed below, in response to receiving the request, the communication management resource 142 (corresponding components such as P-CSCF, H-PCF, I-CSCF, and HSS) establishes the communication path 175 extending between the communication device 121 through a combination of the first private wireless network 191 and the second private wireless network 192, connecting the communication device 121 to the remote communication device 122.

In operation #2, and via communications 521, the P-CSCF of the private wireless network 192 communicates an identity associated with the communication device 121 to the H-PCF. In one embodiment, the P-CSCF communicates the network address of the communication device 121 (such as unique device identifier value=XXXX) to the H-PCF. In one embodiment, via the received unique device identifier value, the H-PCF detects that the requesting communication device 121 assigned XXXX is a member of the second private wireless network 192.

Subsequent to detecting that requesting communication device 121 is a member of the private wireless network 192 based on the received network address=XXXX, via communications 523, the H-PCF of communication management resource 142 queries the V-PCF in private wireless network 191 for its unique network identifier value.

As previously discussed, in one embodiment, the unique network identifier value assigned to the private wireless network 191 can be any suitable value and retrieved from any suitable resource. In one embodiment, the unique network identifier value is a PLMNID (Public Land Mobile Network IDentifier) and NID (Network IDentifier) assigned to the first private wireless network 191 (such as AAAA or PLMNID3+NID1).

In response to the query from the P-CSCF, such as via N24 signaling, the V-PCF of the private wireless network 191 returns a value such as the PLMN-ID3+NID1 (such as associated with UNIV1=AAAA) of the serving SNPN (private wireless network 191).

As further shown, via communications 525, the H-PCF communicates the unique network identifier value (such as PLMN ID3+NID1) associated with the private wireless network 191 to the P-CSCF of private wireless network 192. In one embodiment, the H-PCF communicates unique network identifier value of AAAA (such as PLMN ID3+NID1) to the P-CSCF in an NPCF policy authentication notification.

Via communications 530 in operation #3, the P-CSCF includes the received unique network identifier value=AAAA (such as PLMN ID3+NID1) in the SIP REGISTER request before forwarding the request to the I-CSCF.

Via communications 540 in operation #4, the I-CSCF includes the unique network identifier value AAAA (such as PLMN ID3+NID1) associated with the private wireless network 191 to the HSS (of communication management resource 142) in a Cx-Query message as part of the Normal IMS registration procedure. Thus, the HSS receives the identity of the private wireless network 191 that potentially supports roaming services.

Via function 550, the HSS determines, based on a local policy such as via table 165, whether this IMS registration request from the communication device 121 and private wireless network 191 can be accepted or not. In one embodiment, the acceptance is based on any IMS roaming restrictions associated with the private wireless network 191 (Serving SNPN) identified by the unique network identifier value=AAAA (PLMN3 ID+NID1).

More specifically, in one nonlimiting example embodiment as shown in FIG. 6, via function 550, the HSS accesses the policy information in table 165 to determine whether the wireless network 191 assigned unique identifier value AAAA is the best option or acceptable to provide the communication device 121 wireless connectivity. If so, the communications 560 notify the I-CSCF of the approval of use of the wireless network 191 by the communication device 121. In operation #6, regardless of whether accepted rejected, via communications 560, the HSS communicates the Cx query response (including the unique network identifier value AAAA) to the I-CSCF.

Additionally, the communication management resource 142 and corresponding components (such as HSS and UDM) perform operations A1, A2, and A3.

More specifically, via operation A1, the HSS notifies the UDM via communications 562 that attempted registration of the communication device 121 to use the wireless network 191 has been rejected or accepted.

In response to receiving via communications 562, via operation A2, the UDM communicates an acknowledge notification (communications 564 such as NU1 response) in operation #6.2 to the HSS.

In response to receiving the communications 560, the UDM executes function 568 such as a roaming control function in operation #6.3. In one embodiment, as described herein, via the roaming control function 568, the UDM controls roaming of the communication device 121 to an appropriate wireless network.

For example, in one embodiment, the UDM or other suitable entity determines which of multiple wireless networks are best suited or are at least candidates to provide the communication device 121 wireless access at its current location.

In response to detecting presence of the identity of one or more unique network identifier values indicating best suited candidate wireless networks to provide the communication device 121 wireless connectivity to the remote network 190, and that the identified candidate wireless networks are valid serving network supporting roaming wireless services on behalf of the service provider of wireless network 192, as further discussed herein, the communication management resource 142 communicates the identities of the candidate (partner) wireless networks (such as via roaming information in list 265 as previously discussed in FIG. 2) to the communication device 121. Examples of executing the SoR procedure or roaming management function (such as implemented by the SOR-AF or other suitable entity) to control roaming of the communication device 121 are further discussed below in the following FIGS and text.

In accordance with further example embodiments, as previously discussed, the communication device 121 selects from the multiple candidate wireless networks as indicated by the roaming information in list 265.

Figure 7:
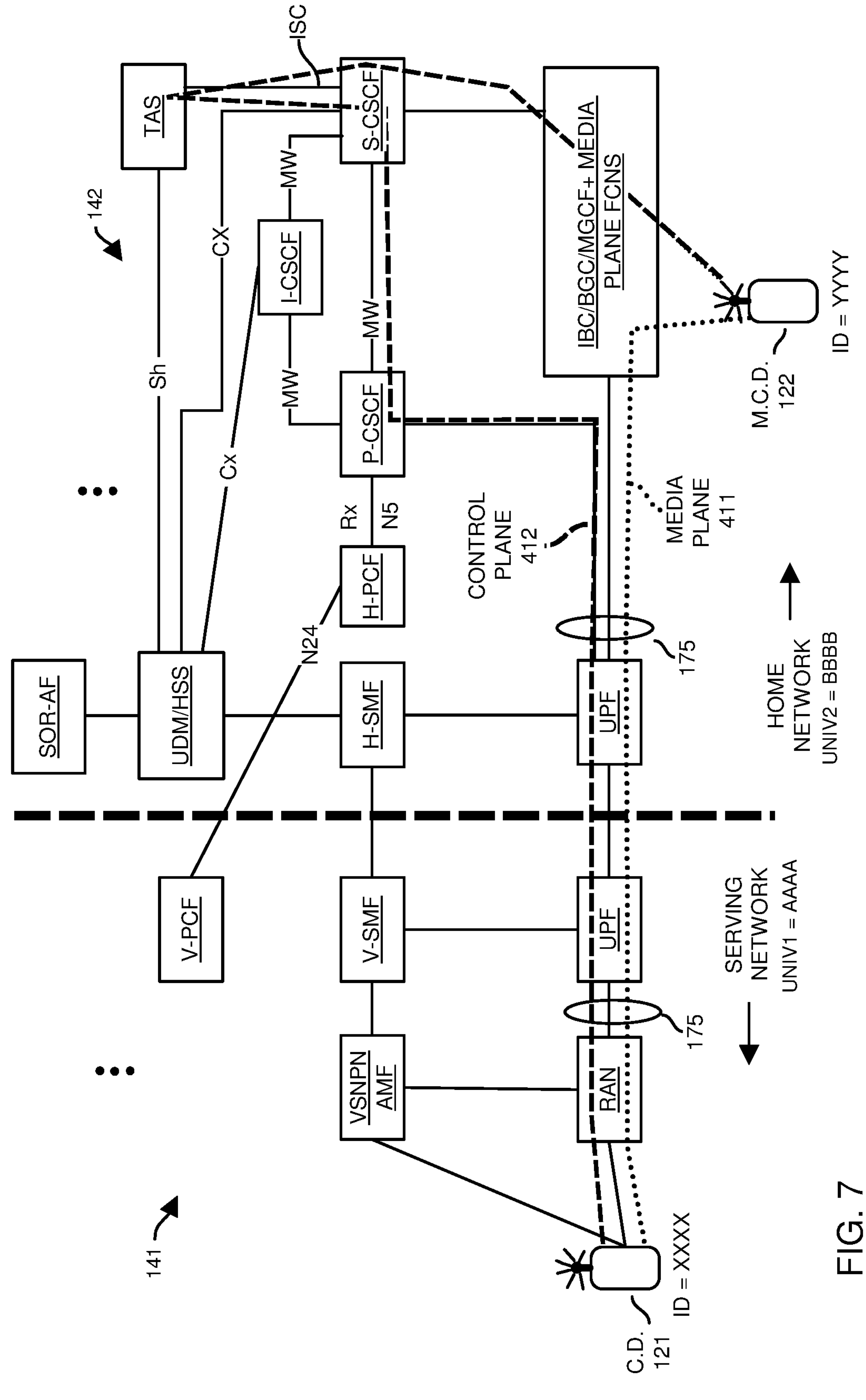
FIG. 7 is an example diagram illustrating established connectivity extending through multiple networks according to embodiments herein.

FIG. 7 is an example diagram illustrating a communication link extending through multiple networks according to embodiments herein.

As further shown in this example embodiment, the combination of private wireless network 191 and private wireless network 192 establish the communication path 175 (connectivity) in a manner as previously discussed via SIP registration. In one embodiment, the communication path 175 includes a media plane 411 and control plane 412 supporting the connectivity.

As its name suggests, in one embodiment, the media plane 411 supports voice communications between the communication device 121 and the communication device 122. Additionally, or alternatively, the media plane 411 supports data communications (such as non-voice communications) between the communication device 121 and the communication device 122.

As previously discussed, the SOR-AF is optional. Roaming control functions as described herein can be implemented by the UDM/HSS or other suitable entity.

Figure 8:
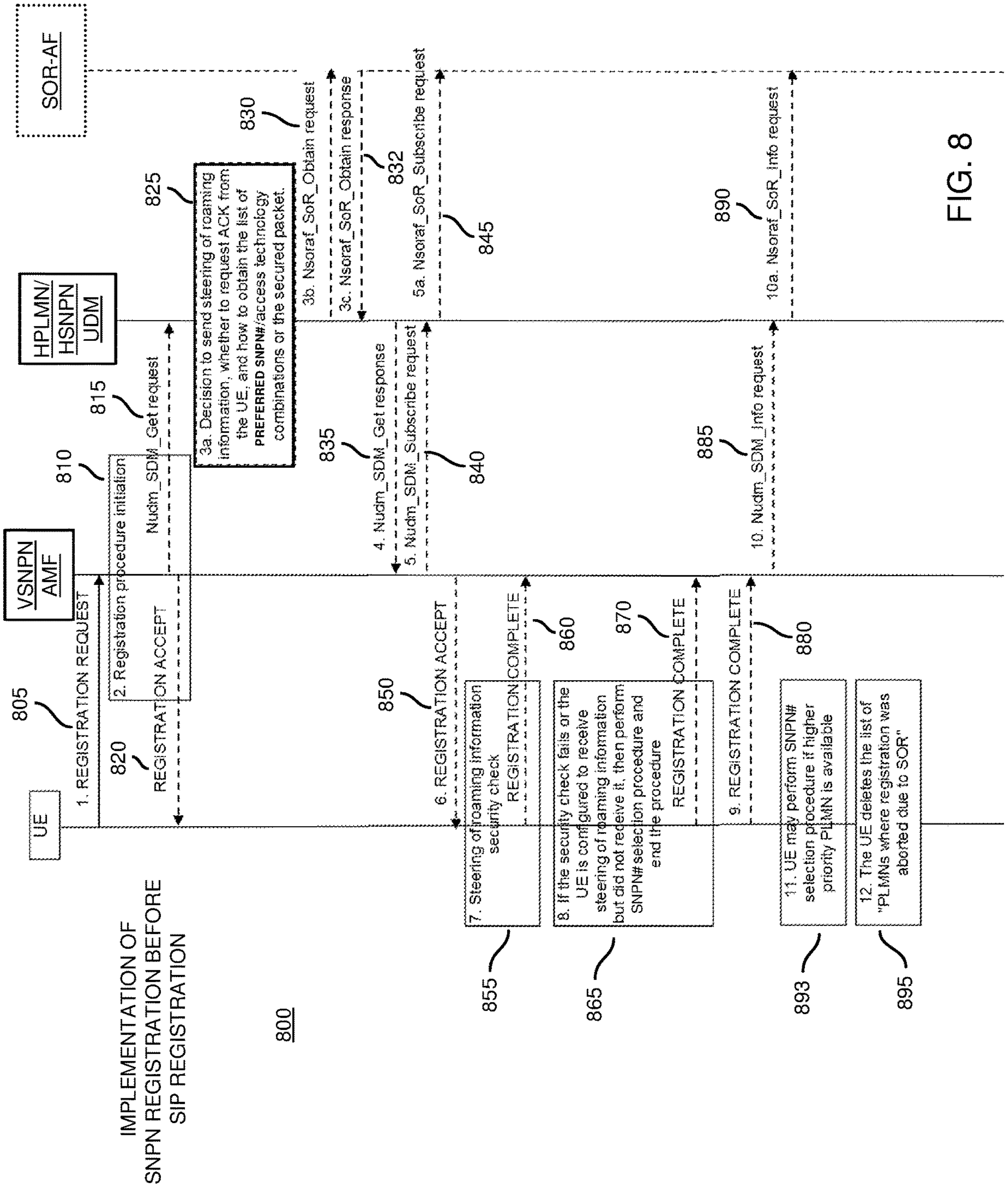
FIG. 8 is an example diagram illustrating a procedure for providing a list of preferred wireless networks as roaming candidates before registration according to embodiments herein.

FIG. 8 is an example diagram illustrating a roaming management function providing notification of a list of preferred wireless networks as roaming candidates during SNPN registration (such as before SIP registration) according to embodiments herein.

As previously discussed, the SOR-AF is optional. Roaming control functions as described herein can be implemented by the HPLMN/HSNPN UDM instead.

1) The UE to the VSNPN AMF: Via communications 805, the UE (communication device 121) initiates initial registration, emergency registration or mobility registration update procedure to the VSNPN AMF by sending a REGISTRATION REQUEST message (communications 805) with the registration type IE indicating "initial registration", "emergency registration" or "mobility registration updating";

2) Upon receiving the REGISTRATION REQUEST message (communications 805), the VSNPN AMF executes a registration procedure. As part of the registration procedure;

- a) if the VSNPN AMF does not have subscription data for the UE, the VSNPN AMF invokes Nudm_SDM_Get service operation to the HPLMN/HSNPN UDM to get amongst other information the Access and Mobility Subscription data for the UE (such as akin to step 14b in subclause 4.2.2.2.2 of 3GPP TS 23.502 [63]); or
- b) if the VSNPN AMF already has subscription data for the UE and
  - i) the 5GS registration type IE in the received REGISTRATION REQUEST message (communications 805) indicates "initial registration" and the "SoR Update Indicator for Initial Registration" field in the UE context is set to 'the UDM requests the AMF to retrieve SoR information when the UE performs NAS registration type "initial registration"' such as specified in table 5.2.2.2.2-1 of 3GPP TS 23.502 [63]); or ii) the registration type IE in the received REGISTRATION REQUEST message (communications 805) indicates "emergency registration" and the "SoR Update Indicator for Emergency Registration" field in the UE context is set to 'the UDM requests the AMF to retrieve SoR information (identity of acceptable one or more candidate wireless networks to wirelessly support the requesting communication device 121) when the UE performs NAS registration type "emergency registration;"

then the VSNPN AMF invokes a Nudm_SDM_Get service operation message (via communications 815) to the HPLMN/HSNPN UDM to retrieve the steering of roaming information (such as available candidate wireless networks in which the communication device 121 can select to establish a respective wireless communication link and access remote network 190 and communicate with corresponding one or more communication devices such as communication device 122, server resource 196, etc.);

otherwise the VSNPN AMF sends a REGISTRATION ACCEPT message (via communications 820) without the steering of roaming information to the UE and steps 3a, 3b, 3c, 3d, 4, 5, 5a, 6 are skipped;

3a) If the user subscription information associated with communication device 121 indicates to send the steering of roaming information due to initial registration in a VSNPN, then the HPLMN/HSNPN UDM provides the steering of roaming information to the UE when the UE performs initial registration in a VSNPN, otherwise the HPLMN/HSNPN UDM may provide the steering of roaming information to the UE, based on operator policy.

If the HPLMN/HSNPN UDM is to provide the steering of roaming information to the UE when the UE performs the registration in a VSNPN, and the HPLMN/HSNPN policy for the SOR-AF invocation is absent then operations 3b and 3c (such as communications 830 and 832) are not performed.

If the HPLMN/HSNPN UDM is to provide (via the roaming management function) the steering of roaming information to the UE when the UE performs the registration in a VSNPN (such as wireless network 191), and the HPLMN/HSNPN policy for the SOR-AF invocation is present, then the HPLMN/HSNPN UDM obtains the list of preferred SNPN/access technology combinations (roaming control information in list 265 of FIG. 2) or the secured packet from the SOR-AF using operations 3b and 3c (such as communications 830 and 832).

3b) The HPLMN/HSNPN UDM to the SOR-AF: Nsoraf_SoR_Obtain request (VSNPN ID, SUPI of the UE, access type, RAT type). The VSNPN ID is the SNPN ID (PLMN ID+NID) of the VSNPN where the UE is registering, as stored in the HPLMN/HSNPN UDM. The access type is the access type where the UE is registering, as stored in the HPLMN/HSNPN UDM. The RAT type is the RAT type where the UE is registering, as stored in the HPLMN/HSNPN UDM.

3c) The SOR-AF to the HPLMN/HSNPN UDM: Nsoraf_SoR_Obtain response (the list of preferred SNPN/access technology combinations, or the secured packet, or neither of them).

Based on the information received in operation 3b (communications 830) and any operator specific criteria, the SOR-AF (roaming management function) includes the list of preferred SNPN/access technology combinations (list of available candidate wireless networks N11, N17, N23, etc., for selection by the communication device 121) or the secured packet in the Nsoraf_SoR_Obtain response or may provide the Nsoraf_SoR_Obtain response with neither a list of preferred SNPN/access technology combinations nor a secured packet.

In one embodiment, based on operator deployment and policy, if the UDM receives the list of preferred SNPN/access technology combinations in the Nsoraf_SoR_Obtain response from the SOR-AF (roaming management function), and the UDM supports communication with OTAF, it sends this list to OTAF requesting it to provide this information in a secured packet as defined in 3GPP TS 29.544 [71]. In one embodiment, the UDM is configured to perform such an operation as specified by CT4.

In one embodiment, the SOR-AF includes a different list of preferred SNPN/access technology combinations or a different secure packet for each Nsoraf_SoR_Obtain request even if the VSNPN ID, the SUPI of the UE, the access type, and the RAT type are the same.

3d) The HPLMN/HSNPN UDM produces the steering of roaming information such as specified in 3GPP TS 33.501 [66] from the list of preferred SNPN/access technology combinations or the secured packet obtained in step 3a or the list of preferred SNPN/access technology combinations or the secured packet, obtained in step 3c. If:

neither the list of preferred SNPN/access technology combinations nor the secured packet was obtained in steps 3a or 3c; or the SOR-AF has not sent to the HPLMN/HSNPN UDM an Nsoraf_SoR_Obtain response (step 3c) within an operator defined time after the HPLMN/HSNPN UDM sending to the SOR-AF an Nsoraf_SoR_Obtain request (step 3b) [In one embodiment, note that stage 3 defines the timer needed for the SOR-AF to respond to the HPLMN/HSNPN UDM. The maximum time is defined considering that this procedure is part of the Registration procedure.] and the UE performs initial registration in a VSNPN and the user subscription information indicates to send the steering of roaming information due to initial registration in a VSNPN, then the HPLMN/HSNPN UDM forms the steering of roaming information such as specified in 3GPP TS 33.501 [66] from the HPLMN/HSNPN indication that 'no change of the "Operator Controlled SNPN Selector with Access Technology" list stored in the UE is needed and thus no list of preferred SNPN/access technology combinations is provided'.

4) The HPLMN/HSNPN UDM to the VSNPN AMF: The HPLMN/HSNPN UDM sends a response (such as via communications 835) to the Nudm_SDM_Get service operation to the VSNPN AMF, which includes the steering of roaming information within the Access and Mobility Subscription data. In one embodiment, the Access and Mobility Subscription data type is defined in subclause 5.2.3.3.1 of 3GPP TS 23.502 [63]). In one embodiment, the HPLMN/HSNPN requests the UE to acknowledge the successful security check of the received steering of roaming information, by providing the indication as part of the steering of roaming information in the Nudm_SDM_Get response service operation;

5) The VSNPN AMF to the HPLMN/HSNPN UDM: As part of the registration procedure, the VSNPN AMF also invokes Nudm_SDM_Subscribe service operation (such as via communications 840) to the HPLMN/HSNPN UDM to subscribe to notification of changes of the subscription data received in step 4) including notification of updates of the steering of roaming information included in the Access and Mobility Subscription data;

5a) The HPLMN/HSNPN UDM to the SOR-AF: Nsoraf-_SoR_Subscribe (SUPI) communications 845. If the HPLMN/HSNPN policy for the SOR-AF invocation is present, the HPLMN/HSNPN UDM subscribes to the SOR-AF to be notified about changes in the list of preferred SNPN/access technology combinations or the secured packet, for the SUPI of the UE, if not already subscribed.

In one embodiment, note that the HPLMN/HSNPN UDM can subscribe to the SOR-AF to be notified about changes in the list of preferred SNPN/access technology combinations for the SUPI during initial registration of the SUPI in the 5GC. The HPLMN/HSNPN UDM can unsubscribe to be notified about changes in the list of prefered SNPN/access technology combinations for the SUPI upon deregistration of the SUPI from the 5GC using the Nsoraf_SoR_Unsubscribe service operation.

6) The VSNPN AMF to the UE: The VSNPN AMF transparently sends the received steering of roaming information to the UE in the REGISTRATION ACCEPT message (such as via communications 850);

7) If the steering of roaming information is received and the security check is successful, then:

a) if the steering of roaming information contains a secured packet:

if the UDM has not requested an acknowledgement from the UE, the UE (communication device 121) sends the REGISTRATION COMPLETE message without including an SOR transparent container;

the ME uploads the secured packet to the USIM such as using procedures in 3GPP TS 31.111 [41].

In one embodiment, note that how the ME (Mobile Equipment of the communication device 121) handles UICC responses and failures in communication between the ME and UICC is implementation specific and out of scope of this release of the specification.

if the UDM has not requested an acknowledgement from the UE and the ME receives a USAT REFRESH command qualifier (such as 3GPP TS 31.111 [41]) of type "Steering of Roaming" its performs items a), b) and c) of the procedure for steering of roaming in subclause 4.4.6 and if the UE has a list of available and allowable SNPNs in the area and based on this list the UE determines that there is a higher priority SNPN than the currently camped chosen VSNPN and the UE is in automatic network selection mode, then the UE either:

i) release the current N1 NAS signaling connection locally and then attempt to obtain service on a higher priority SNPN as specified in subclause 4.4.3.3 by acting as if timer T that controls periodic attempts has expired. In this case, steps 8 to 11 are skipped. If the UE has an established emergency PDU session (such as 3GPP TS 24.501 [64]), the receipt of the steering of roaming information does not trigger the release of the N1 NAS signaling connection. The UE releases the current N1 NAS signaling connection locally subsequently after the emergency PDU session is released; or ii) not release the current N1 NAS signaling connection locally and skip steps 8 to 10;

b) if the steering of roaming information contains the list of preferred SNPN/access technology combinations, the ME replaces the highest priority entries in the "Operator Controlled SNPN Selector with Access Technology" list stored in the ME with the received list of preferred SNPN/access technology combinations (which indicates the one or more wireless networks available for use by the communication device 121 to access remote 190). Additionally, if the UDM has not requested an acknowledgement from the UE and if the UE has a list of available and allowable SNPNs in the area and based on this list the UE determines that there is a higher priority SNPN than the currently camped chosen VSNPN and the UE is in automatic network selection mode, then the UE sends the REGISTRATION COMPLETE message to the serving AMF without including an SOR transparent container and then either:

i) release the current N1 NAS signaling connection locally and then attempt to obtain service on a higher priority SNPN by acting as if timer T that controls periodic attempts has expired. In this case, steps 8 to 11 are skipped. If the UE has an established emergency PDU session, the receipt of the steering of roaming information does not trigger the release of the N1 NAS signalling connection. The UE releases the current N1 NAS signalling connection locally subsequently after the emergency PDU session is released; or ii) not release the current N1 NAS signalling connection locally and skip steps 8 and 10;

8) If:

a) the UE's USIM is configured with indication that the UE is to receive the steering of roaming information due to initial registration in a VSNPN, but neither the list of preferred SNPN/access technology combinations nor the secured packet nor the HPLMN/HSNPN indication that 'no change of the "Operator Controlled SNPN Selector with Access Technology" list stored in the UE is needed and thus no list of preferred SNPN/access technology combinations is provided' is received in the REGISTRATION ACCEPT message, when the UE performs initial registration in a VSNPN or if the steering of roaming information is received but the security check is not successful; and b) the current chosen VSNPN is not contained in the list of "SNPNs where registration was aborted due to SOR", not part of "User Controlled PLMN Selector with Access Technology" list, the UE is not in manual mode of operation;

then the UE sends the REGISTRATION COMPLETE message (communications 860) to the serving VSNPN AMF without including an SOR transparent container, releases the current N1 NAS signaling connection locally, stores the SNPN identity in the list of "SNPNs where registration was aborted due to SOR" and attempt to obtain service on a higher priority SNPN by acting as if timer T that controls periodic attempts has expired, with an exception that the current SNPN is considered as lowest priority, and skip steps 9 to 12. If the UE has an established emergency PDU session, the UE releases the current N1 NAS signaling connection locally after the release of the emergency PDU session;

In one embodiment, when the UE is in the manual mode of operation or the current chosen VSNPN is part of the "User Controlled SNPN Selector with Access Technology" list, the UE stays connected to the VSNPN.

9) The UE to the VSNPN AMF: If the UDM has requested an acknowledgement from the UE:

the UE verified that the steering of roaming information has been provided by the HPLMN/HSNPN in step 7, the UE sends the REGISTRATION COMPLETE message (via communications 880) to the serving AMF with an SOR transparent container including the UE acknowledgement; and if the steering of roaming information contained a secured packet and the security check was successful, then when the UE receives the USAT REFRESH command qualifier of type "Steering of Roaming", it performs items a), b) and c) of the procedure for steering of roaming in subclause 4.4.6.

10) The VSNPN AMF to the HPLMN/HSNPN UDM: If an SOR transparent container is received in the REGISTRATION COMPLETE message (860), the AMF uses the Nudm_SDM_Info service operation (such as communications 885) to provide the received SOR transparent container to the UDM. If the HPLMN/HSNPN decided that the UE is to acknowledge the successful security check of the received steering of roaming information in step 4, the UDM verifies that the acknowledgement such as provided by the UE as specified in 3GPP TS 33.501 [66];

10a) The HPLMN/HSNPN UDM to the SOR-AF: Nsoraf_SoR_Info (SUPI of the UE, successful delivery). If the HPLMN/HSNPN policy for the SOR-AF invocation is present and the HPLMN/HSNPN UDM received and verified the UE acknowledgement in step 10, then the HPLMN/HSNPN UDM informs the SOR-AF (via communications 890) about successful delivery of the list of preferred PLMN/access technology combinations, or of the secured packet to the UE;

11) If the UE has a list of available SNPNs in the area and based on this list the UE determines that there is a higher priority SNPN than the currently camped on chosen VSNPN and the UE is in automatic network selection mode, then the UE attempts to obtain service on a higher priority SNPN by acting as if timer T that controls periodic attempts has expired after the release of the N1 NAS signaling connection. If the N1 NAS signaling connection is not released after implementation dependent time, the UE may locally release the N1 signaling connection except when the UE has an established emergency PDU session; and 12) The UE deletes the list of "SNPNs where registration was aborted due to SOR".

The list of "SNPNs where registration was aborted due to SOR" is deleted when the UE is switched off or the USIM is removed.

When the UE performs initial registration for emergency services while the UE has a valid USIM and the AMF performs the authentication procedure, then based on HPLMN/HSNPN policy, the SOR procedure described in this following subclause may apply.

If:

the UE in manual mode of operation encounters scenario mentioned in subclause 8(a) above; and upon switching to automatic network selection mode the UE remembers that it is still registered on the SNPN where the missing or security check failure of SOR information was encountered as described in subclause 8(a);

the UE waits until it moves to idle mode or 5GMM-CONNECTED mode with RRC inactive indication before attempting to obtain service on a higher priority SNPN as specified in subclause 4.4.3.3, by acting as if timer T that controls periodic attempts has expired, with an exception that the current registered SNPN is considered as lowest priority. If the UE has an established emergency PDU session, then the UE attempts to perform the SNPN selection subsequently after the emergency PDU session is released.

In one embodiment, the receipt of the steering of roaming information by itself does not trigger the release of the emergency PDU session.

Figure 9:
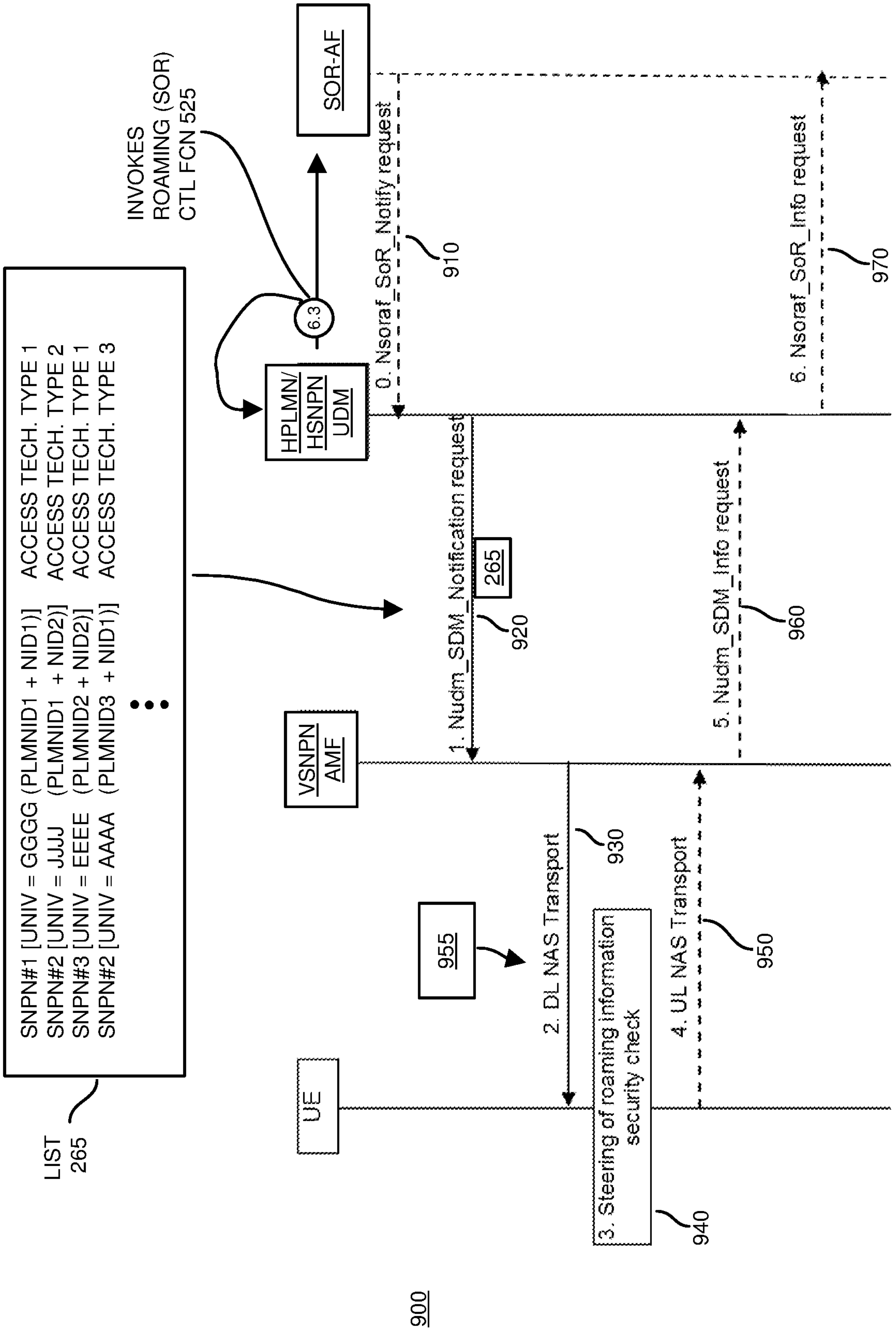
FIG. 9 is an example diagram illustrating a procedure for providing a list of preferred wireless networks as roaming candidates after registration according to embodiments herein.

FIG. 9 is an example diagram illustrating a flow for steering and providing a list of preferred wireless networks as roaming candidates after SNPN registration according to embodiments herein.

As previously discussed, the SOR-AF is optional. Roaming control functions as described herein can be implemented by the HPLMN/HSNPN UDM instead.

In this example embodiment, as discussed below, the communication device 121 performs IMS registration (a higher level registration) for use of one or more wireless services such as data access Internet services after lower level SNPN registration.

0) If present, SOR-AF to the HPLMN/HSNPN UDM: Nsoraf_SoR_Notify request (via communications 810) is sent from the SOR-AF (executing roaming management function) to inform the HPLMN/HSNPN UDM about the change in the list of preferred SNPN/access technology combinations or a secured packet for a UE identified by SUPI.

1) The HPLMN/HSNPN UDM to the VSNPN AMF: Via communications 820, the UDM notifies the changes of the user profile to the affected AMF by the means of invoking Nudm_SDM_Notification service operation. The Nudm_SDM_Notification service operation contains the steering of roaming information that needs to be delivered transparently to the UE (communication device 121) over NAS within the Access and Mobility Subscription data. If the HPLMN/HSNPN UDM decided that the communication device 121 is to acknowledge successful security check of the received steering of roaming information, the Nudm_SDM_Notification service operation also contains an indication that the HPLMN/HSNPN UDM requests an acknowledgement from the communication device 121 as part of the steering of roaming information. In one embodiment, the communications include a notification of identities of one or more candidate wireless networks available to provide the communication device 121 wireless connectivity to the remote network 190.

2) The VSNPN AMF to the UE: via communications 830, the VSPN AMF sends a DL NAS TRANSPORT message to the served communication device 121 (user equipment). The VSPN AMF includes in the DL NAS TRANSPORT message the steering of roaming information received from the UDM. In one embodiment, the communications 830 include a notification of identities of one or more candidate wireless networks available to provide the communication device 121 wireless connectivity to the remote network 190.

3) Upon receiving the steering of roaming information including identities of one or more candidate wireless networks available (in list 855) to provide the communication device 121 wireless connectivity to the remote network 190, the communication device 121 performs (such as in operation 840) one or more operations such as a security check on the list of preferred SNPN/access technology combinations included in the DL NAS TRANSPORT message to verify that the list of preferred SNPN/access technology combinations is provided by HPLMN/HSNPN, and:

a) if the security check is successful and:

if the steering of roaming information contains a secured packet, the ME uploads the secured packet to the USIM;

When the ME (Mobile Equipment associated with communication device 121) receives a USAT REFRESH command qualifier (see 3GPP TS 31.111 [41]) of type "Steering of Roaming" it performs the procedure for steering of roaming in subclause 4.4.6 with an exception that if the UE (communication device 121) is in automatic network selection mode, then the UE waits until it moves to idle mode or 5GMM-CONNECTED mode with RRC inactive indication (see 3GPP TS 24.501 [64]) before attempting to obtain service on a higher priority SNPN (specified in subclause 4.4.6 bullet d);

otherwise, the ME replaces the highest priority entries in the "Operator Controlled SNPN Selector with Access Technology" list stored in the ME with the received list 855 of preferred network selection mode, then the UE waits until it moves to idle mode or 5GMM-CONNECTED mode with RRC inactive indication (see 3GPP TS 24.501 [64]) before attempting to obtain service on a higher priority SNPN as specified in subclause 4.4.3.3 by acting as if timer T that controls periodic attempts has expired.

If the UE has an established emergency PDU session then the UE attempts to perform the SNPN selection subsequently after the emergency PDU session is released.

In one embodiment, receipt of the steering of roaming information (such as including list 855 and corresponding messaging) by itself does not trigger the release of the emergency PDU session.

If the UDM has not requested an acknowledgement from the UE then steps 4 and 5 are skipped; and b) if the security check is not successful and the UE is in automatic network selection mode, then the UE waits until it moves to idle mode or 5GMM-CONNECTED mode with RRC inactive indication (see 3GPP TS 24.501 [64]) before attempting to obtain service on a higher priority SNPN as specified in subclause 4.4.3.3 by acting as if timer T that controls periodic attempts has expired, with an exception that the current SNPN is considered as lowest priority. If the UE has an established emergency PDU session then the UE attempts to perform the SNPN selection after the emergency PDU session is released.

In one embodiment, receipt of the steering of roaming information by itself does not trigger the release of the emergency PDU session.

In accordance with further example embodiments, if the UDM has not requested an acknowledgement from the UE then steps 4 and 5 are skipped.

In accordance with still further example embodiments, when the UE is in the manual mode of operation or the current chosen VSNPN is part of the "User Controlled SNPN Selector with Access Technology" list, the UE stays on the VSNPN.

4) The UE to the VSNPN AMF: if the UDM has requested an acknowledgement from the UE in the DL NAS TRANSPORT message (communications 830) and the security check in step 2 was successful, the UE sends an UL NAS TRANSPORT message (via communications 850) to the serving AMF with an SOR transparent container including the UE acknowledgement; and 5) The VSNPN AMF to the HPLMN/HSNPN UDM: If the UL NAS TRANSPORT message (communications 850) with an SOR transparent container is received, the VSPN AMF uses the Nudm_SDM_Info service operation (such as based on the Nudm_SDM_info request associated with communications 860) to provide the received SOR transparent container to the UDM. If the HPLMN/HSNPN decided that the UE is to acknowledge successful security check of the received list of preferred SNPN/access technology combinations in step 1, the UDM verifies that the acknowledgement is provided by the UE.

If the present flow was invoked by the HPLMN/HSNPN UDM being notified by the SOR-AF about a change in the list of preferred SNPN/access technology combinations (such as list 855) or a secured packet for a UE identified by SUPI using an Nsoraf_SoR_Notify service operation, and the HPLMN/HSNPN UDM verification of the UE acknowledgement is successful, then the HPLMN/HSNPN UDM informs the SOR-AF about successful delivery of the list of preferred SNPN/access technology combinations, or of the secured packet to the UE, using Nsoraf_SoR_Info (SUPI of the UE, successful delivery).

6) The HPLMN/HSNPN UDM to the SOR-AF: Nsoraf_SoR_Info (SUPI of the UE, successful delivery). If the HPLMN/HSNPN policy for the SOR-AF invocation is present and the HPLMN/HSNPN UDM received and verified the UE acknowledgement in operation #5, then the HPLMN/HSNPN UDM informs (via communications 870) the SOR-AF about successful delivery of the list of preferred SNPN/access technology combinations, or of the secured packet to the UE.

If:

the UE in manual mode of operation encounters security check failure of SOR information in DL NAS TRANSPORT message; and upon switching to automatic network selection mode the UE remembers that it is still registered on the SNPN where the security check failure of SOR information was encountered;

then the UE waits until it transitions to idle mode or 5GMM-CONNECTED mode with RRC inactive indication before attempting to obtain service on a higher priority SNPN, by acting as if timer T that controls periodic attempts has expired, with an exception that the current registered SNPN is considered as lowest priority. If the UE has an established emergency PDU session, then the UE attempts to perform the SNPN selection after the emergency PDU session is released.

In one embodiment, receipt of the steering of roaming information by itself does not trigger the release of the emergency PDU session.

Figure 10:
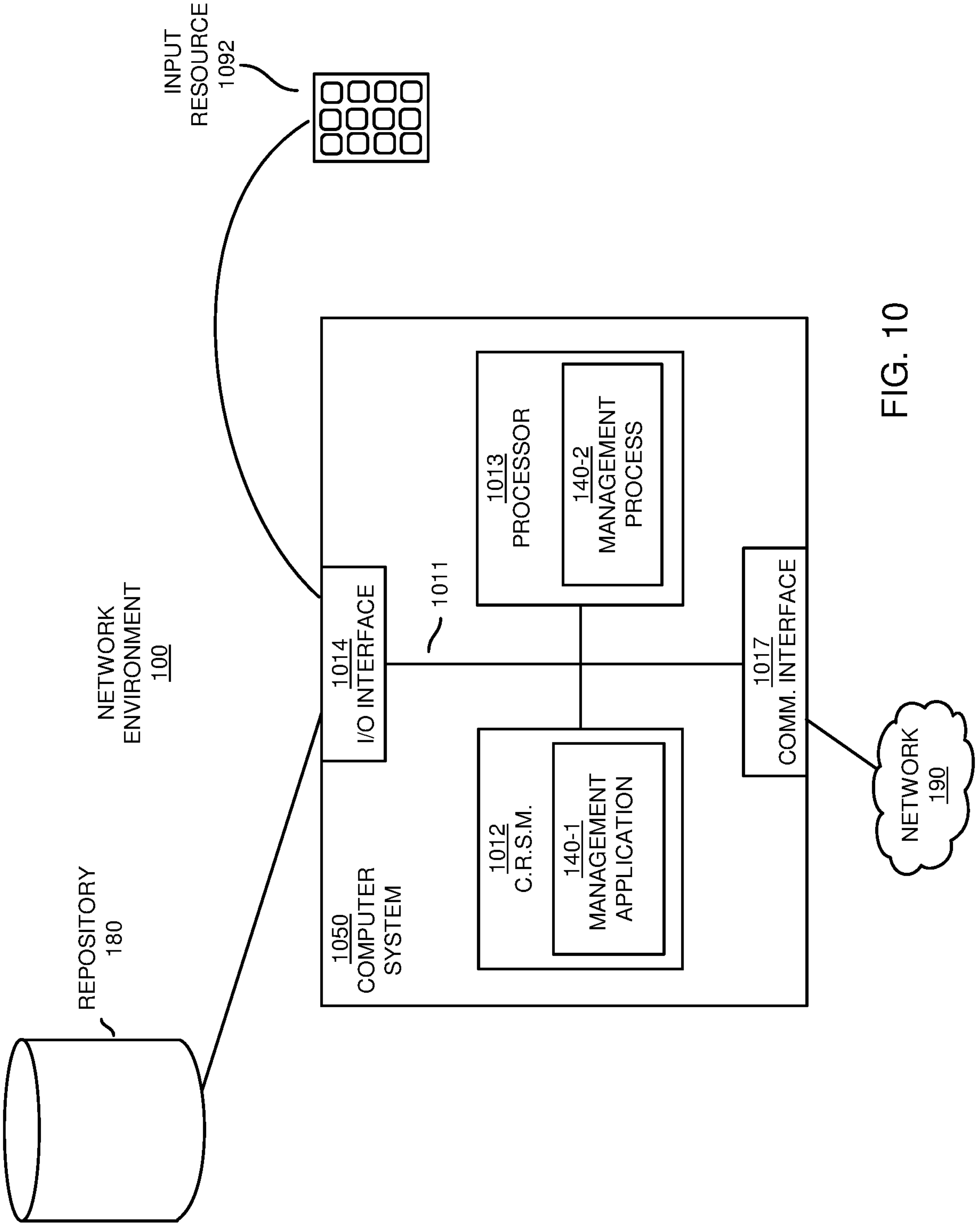
FIG. 10 is a diagram illustrating example computer architecture to execute one or more operations according to embodiments herein.

FIG. 10 is an example block diagram of a computer system for implementing any of the operations as discussed herein according to embodiments herein.

As previously discussed, any of the resources (such as communication device 121, communication management resource 141, communication management resource 142, private wireless network 191, private wireless network 192, private wireless network 193, UDM/HSS (Unified Data Management/Home Subscriber Server), H-SMF (Home-Session Management Function), H-PCF (Home Policy Control Function), P CSCF (Proxy Call Session Control Function), I CSCF (Intermediate Proxy Call Session Control Function), S CSCF (Serving Call Session Control Function), TAS (Telephony Application Server), HPLMN/HSNPN UDM, SOR-AF, and UPF (User Plane Function, etc.) as discussed herein can be configured to include computer processor hardware and corresponding executable instructions to carry out the different operations as discussed herein.

As shown, computer system 1050 of the present example can include an interconnect 1011 that couples computer readable storage media 1012 such as a non-transitory type of media (such as a type of hardware storage medium) in which digital information can be stored and retrieved, a processor 1013, I/O interface 1014, and a communications interface 1017.

I/O interface 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 140-1 (e.g., including instructions) to carry out any of the operations as discussed herein. As previously discussed, the management application 140-1 can be configured to implement any of the operations as described herein such as those provided by communication management resource 142, communication management resource 141, etc.

During operation of one embodiment, processor 1013 accesses computer readable storage media 1012 via the use of interconnect 1011 in order to launch, run, execute, interpret or otherwise perform the instructions in network management application 140-1 stored on computer readable storage medium 1012. Execution of the network management application 140-1 produces network management process 140-2 to carry out any of the operations and/or processes as discussed herein.

Those skilled in the art will understand that the computer system 1050 can include other processes and/or software and hardware components, such as an operating system that controls allocation and use of hardware resources to network management application 140-1.

In accordance with different embodiments, note that computer system may be or included in any of various types of devices, including, but not limited to, a mobile computer, user equipment, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources as described herein will now be discussed via the method flowchart in FIG. 11. Note that the steps in the flowcharts below can be executed in any suitable order.

Figure 11:
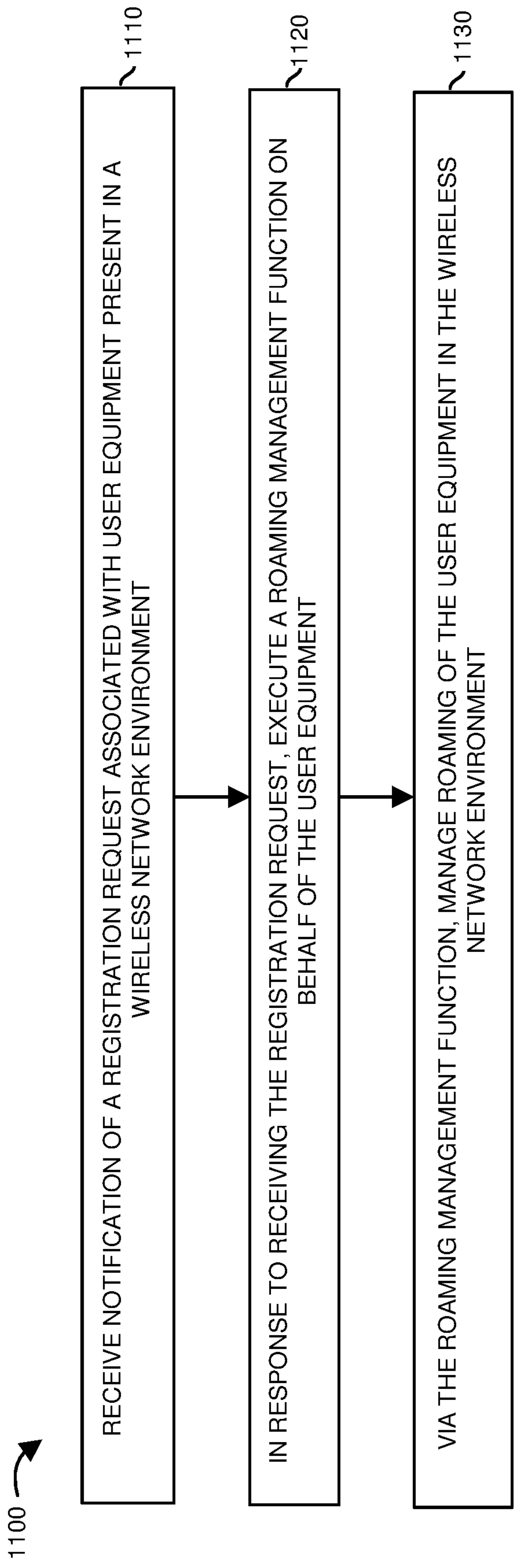
FIG. 11 combine to illustrate an example method according to embodiments herein.

FIG. 11 is a flowchart 1100 illustrating an example method according to embodiments. Note that there will be some overlap with respect to concepts as discussed above.

In processing operation 1110, the communication management resource 142 receives notification of a registration request associated with user equipment (communication device 121) present in a wireless network environment 100.

In processing operation 1120, in response to receiving the registration request, the communication management resource 142 executes a roaming management function on behalf of the user equipment.

In processing operation 1130, via the roaming management function, the communication management resource 142 manages roaming of the user equipment in the wireless network environment.

Note again that techniques herein are well suited to facilitate connectivity of a respective communication device to one of multiple private wireless networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

receiving notification of a registration request generated by user equipment in communication with a first private wireless network, the notification received by a second private wireless network through the first private wireless network, the registration request requesting use of wireless services associated with the first private wireless network;

in response to receiving the notification of the registration request, via the second wireless network, executing a roaming management function on behalf of the user equipment; and via the roaming management function, managing roaming of the user equipment in a wireless network environment including the first private wireless network and the second private wireless network.

2. The method as in claim 1 further comprising:

via the roaming management function, communicating a message from the second wireless network to the user equipment, the message including a set of network identifier values indicating corresponding available candidate private wireless networks available for use by the user equipment to access a remote network through the second private wireless network.

3. The method as in claim 2, wherein the set of network identifier values includes a first network identifier value and a second network identifier value, the first network identifier value indicating the first private wireless network, the second network identifier value indicating a third private wireless network.

4. The method as in claim 3, wherein the network identifier values in the set are ranked in accordance with a priority, the second network identifier value ranked higher in priority than the first network identifier value; and wherein the higher priority ranking of the second network identifier value redirects the user equipment to establish connectivity with the second private wireless network through the third private wireless network as indicated by the second network identifier value.

5. The method as in claim 1 further comprising:

receiving the notification of the registration request at the second private wireless network in response to the user equipment performing a SIP (Session Initiation Protocol) registration via communications received through the first private wireless network.

6. The method as in claim 1 further comprising:

managing roaming of the user equipment in the wireless network environment including the first private wireless network and the second private wireless network based on a geographical location in which the user equipment resides.

7. The method as in claim 1, wherein the registration request is an IMS (Internet Protocol Multimedia Subsystem) registration request.

8. The method as in claim 1, wherein the registration request is an SNPN (Standalone Non-Public Network) registration request.

9. The method as in claim 1 further comprising:

via the roaring management function, steering the user equipment to use a third private wireless network instead of the first private wireless network to communicate with a remote network through the second private wireless network.

10. The method as in claim 9, wherein the first private wireless network is a visiting wireless network through which the user equipment communicates with the second private wireless network to use the first private wireless network, a user of the user equipment subscribing to a service provider operating the second private wireless network.

11. The method as in claim 10 further comprising:

executing the roaming management function in the second wireless network regardless of whether or not the user equipment is allowed use of the first private wireless network to communicate with the second private wireless network.

12. The method as in claim 9 further comprising:

transmitting a communication from the second private wireless network through the first private wireless network to the user equipment, the communication steering the user equipment to establish connectivity with the second private wireless network via the third private wireless network.

13. The method as in claim 1 further comprising:

executing the roaming management function in the second private wireless network in response to rejecting or allowing the user equipment to use the first private wireless network to access a remote network through the second private wireless network.

14. The method as in claim 1 further comprising:

detecting that the first private wireless network does not support connectivity of the user equipment to the second private wireless network.

15. The method as in claim 14 further comprising:

in response to detecting that the first private wireless network does not support connectivity of the user equipment to the second private wireless network, via the roaming management function, notifying the user equipment of an identity of a third private wireless network supporting connectivity of the user equipment to the second private wireless network.

16. The method as in claim 15 further comprising:

via the second private wireless network, receiving communications from the user equipment through the third private wireless network; and forwarding the received communications through the second private wireless network to a destination in a remote network as specified by the user equipment.

17. The method as in claim 1 further comprising:

via the second private wireless network:

in response to detecting that the user equipment is a member of the second private wireless network, communicating with the first private wireless network to retrieve an identity of the first private wireless network.

18. The method as in claim 1 further comprising:

in response to receiving notification of unsuccessful registration of the user equipment to use the first private wireless network to communicate with the second private wireless network, executing the roaming management function to control connectivity of the user equipment to a third private wireless network supporting communications from the user equipment through the second private wireless network to a remote network.

19. The method as in claim 1 further comprising:

executing the roaming management function in response to detecting that the user equipment is a member of the second private wireless network.

20. The method as in claim 1 further comprising:

at the roaming management function, receiving a communication indicating that the user equipment received the set of network identifier values.

21. The method as in claim 1, wherein managing roaming of the user equipment via the roaming management function includes:

creating a prioritized set of network identifier values indicating corresponding available candidate private wireless networks available for use by the user equipment to access a remote network through the second private wireless network; and communicating the prioritized set of network identifier values to the user equipment.

22. A system comprising:

a communication management resource disposed in a first private wireless network, the communication management resource operative to:

receive notification of a registration request generated by user equipment in communication with a second private wireless network, the notification received by the communication management resource through the second private wireless network, the registration request requesting use of wireless services associated with the second private wireless network;

in response to receiving the notification of the registration request, execute a roaming management function on behalf of the user equipment; and via the roaming management function, manage roaming of the user equipment in the wireless network environment.

23. The system as in claim 22, wherein the communication management resource is further operative to:

via the roaming management function, communicate a message to the user equipment, the message including a set of network identifier values indicating corresponding available candidate private wireless networks available to the user equipment to access a remote network through the first private wireless network.

24. The system as in claim 22, wherein the communication management resource is further operative to:

receive the notification of the registration request in response to the user equipment performing a SIP (Session Initiation Protocol) registration via communications received through the second private wireless network.

25. The system as in claim 22, wherein the communication management resource is further operative to:

manage roaming of the user equipment in the wireless network environment based on a geographical location in which the user equipment resides.

26. The system as in claim 22, wherein the registration request is an IMS (Internet Protocol Multimedia Subsystem) registration request.

27. The system as in claim 22, wherein the registration request is an SNPN (Standalone Non-Public Network) registration request.

28. The system as in claim 22, wherein the user equipment is operative to communicate the registration request through the second private wireless network; and wherein the communication management resource is further operative to redirect the user equipment to use a third private wireless network instead of the second private wireless network to communicate with a remote network through the first private wireless network.

29. The system as in claim 28, wherein the second private wireless network is a visiting wireless network through which the user equipment communicates with the first private wireless network to use the second private wireless network, a user of the user equipment subscribing to a service provider operating the first private wireless network.

30. The system as in claim 29, wherein the communication management resource is further operative to:

execute the roaming management function in the first private wireless network regardless of whether or not the user equipment is allowed use of the second private wireless network to communicate with the first private wireless network.

31. The system as in claim 22, wherein the communication management resource is further operative to:

execute the roaming management function in response to rejecting or allowing the user equipment to use the second private wireless network to access a remote network through the first private wireless network.

32. Computer-readable storage hardware having instructions stored thereon, the instructions, when carried out by computer processor hardware, cause the computer processor hardware to:

receive notification of a registration request generated by user equipment in communication with a first private wireless network present in a wireless network environment, the notification received by a second private wireless network through the first private wireless network, the registration request requesting use of wireless services associated with the first private wireless network;

in response to receiving the notification of the registration request, execute a roaming management function on behalf of the user equipment; and via the roaming management function, manage roaming of the user equipment in the wireless network environment.

* * * * *

UNITED STATES PATENT AND TRADEMARK OFFICE

CERTIFICATE OF CORRECTION

PATENT NO. : 11,395,127 B2
APPLICATION NO. : 17/001935
DATED : July 19, 2022
INVENTOR(S) : Yildirim Sahin and Curt C. Wong It is certified that error appears in the above-identified patent and that said Letters Patent is hereby corrected as shown below:

In the Claims

Column 25, Line 63, replace "roaring", with --roaming--

Signed and Sealed this
First Day of November, 2022

Katherine Kelly Vidal

Katherine Kelly Vidal
*Director of the United States Patent and Trademark Office*